J. Focer.
Fruit Jars.
No. 3,781. Fig. 1. Reissued Dec. 28. 1869.
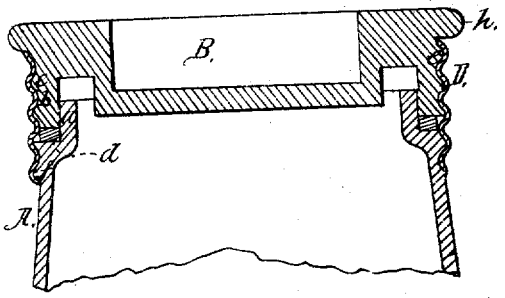
Fig. 2.
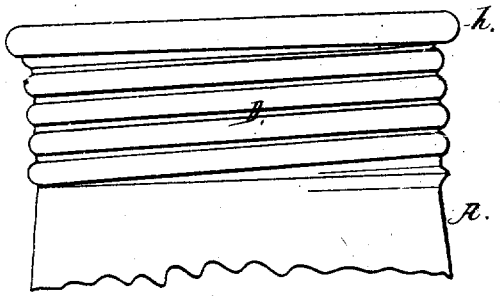
Fig. 3.
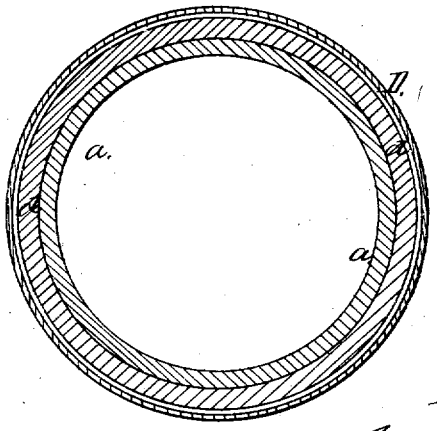
Witnesses.
Wm. Albert Stail
John Parker,
Inventor.
J. Focer
By his Atty
H. Howson
N. PETERS, PHOTO-LITHOGRAPHER, WASHINGTON, D. C.

UNITED STATES PATENT OFFICE.

THOMAS H. WHITNEY AND S. A. WHITNEY, OF GLASSBOROUGH, NEW JERSEY, ASSIGNEES OF JOHN FOCER.

IMPROVEMENT IN FRUIT-JARS.

Specification forming part of Letters Patent No. 55,581, dated June 12, 1866; Reissue No. 3,781, dated December 28, 1869.

*To all whom it may concern:*

Be it known that JOHN FOCER, of Glassborough, in the county of Gloucester and State of New Jersey, did invent certain Improvements in Air-Tight Jars, of which the following is a specification.

This invention relates to air-tight jars in which fruits or vegetables are to be preserved; and the improvements consist, first, in a ring of thin metal having screw-threads adapted to similar threads on the cover and on the neck of the jar; second, in the combination of the jar, cover, screw-threaded ring, and a gasket or packing-ring.

To enable those skilled in the art to make and use this invention, we will proceed to describe its construction and operation.

In the annexed drawings, Figure 1 is a central vertical section of the upper part of an air-tight jar, showing the improvements. Fig. 2 is an elevation thereof. Fig. 3 is a sectional plan on line 1 2 of Fig. 1.

The same letters are used in the designation of identical parts in all the figures.

A represents the neck of a jar, upon the exterior of which is formed a bead or screw-thread, *f*, which vanishes on top in a shoulder, *d*. This shoulder is formed by an abrupt contraction of the neck for the purpose of receiving and supporting a gasket or packing-ring, C. The neck terminates in an annular flange, *a*, which forms the mouth of the jar.

B represents the cover, which has an annular flange, *b*, fitting over the annular flange *a* of the jar. Screw-threads *e*, similar to those on the neck of the jar, are formed upon the exterior of the flange *b*, vanishing on top in a horizontally-projecting flange, *h*.

C represents a gasket or packing-ring, which may be of india-rubber or any other suitable material. It is to be slipped over the flange *a* of the jar and supported upon the shoulder *d* thereof.

D is a ring of thin metal. (Ordinary tinned plates will serve the desired purpose.) In this ring screw-threads are formed adapted to those on the cover and neck of the jar. This screw-ring is first applied to the cover by turning it on the same until its upper edge reaches the projecting flange *h* thereof, after which the remaining portion of the screw-ring is applied to the neck of the jar by turning the cover around until the packing-ring C is so much compressed between the annular flange *b* of the cover and the shoulder *d* of the jar as to form a perfectly air-tight joint.

As the screw-threads can be formed on the glass cover and jar during the process of making the same with but little trouble and expense, and as the ring can have its screw-threads readily formed by suitable rolling machinery, it will be evident that my improved manner of hermetically closing preserve-jars possesses the advantage of simplicity and economy.

Should there be any slight inequalities in the screw-threaded portions of the cover and jar, they will not interfere with the proper adjustment of the ring and cover, inasmuch as the former is so thin as to readily yield to slight inequalities.

What we claim as the invention of the said JOHN FOCER, and desire to secure by Letters Patent, is—

1. The thin metal ring D, having screw-threads adapted to similar threads on the cover B and neck A of a preserving-jar, all substantially as and for the purpose herein set forth.

2. The combination, with a preserve-jar the neck of which is constructed substantially as herein set forth, of the cover B, gasket C, and ring D, as and for the purpose specified.

In testimony whereof we have signed our names to this specification before two subscribing witnesses.

THOS. H. WHITNEY.
S. A. WHITNEY.

Witnesses:
S. W. WARRICK,
THOS. ANNADOM.